United States Patent [19]
Gilbertson et al.

[11] Patent Number: 5,823,293
[45] Date of Patent: Oct. 20, 1998

[54] PROCESS AND APPARATUS FOR LUBRICATING INLINE SKATE BEARINGS AND SKATEBOARD BEARINGS

[76] Inventors: Stephen M. Gilbertson; Jonathan G. Gilbertson, both of 8232 Oakmere Rd., Bloomington, Minn. 55458

[21] Appl. No.: 763,969

[22] Filed: Dec. 10, 1996

[51] Int. Cl.[6] ....................................................... F16C 1/24
[52] U.S. Cl. .............................. 184/5.1; 301/5.7; 384/474
[58] Field of Search .............................. 184/5.1; 301/5.7; 384/474, 471

[56] References Cited

U.S. PATENT DOCUMENTS

| | | | |
|---|---|---|---|
| 1,492,793 | 5/1924 | Hansen | 184/5.1 |
| 1,927,534 | 9/1933 | Wooler | 184/5.1 |
| 4,051,921 | 10/1977 | Sheldon | 184/5.1 |
| 4,428,630 | 1/1984 | Folger et al. | 384/474 |
| 4,492,416 | 1/1985 | Kaufmann | 384/474 |
| 4,796,419 | 1/1989 | Braxmeier | 384/474 |
| 4,928,795 | 5/1990 | Maloney | 184/7.4 |
| 5,328,275 | 7/1994 | Winn et al. | 384/472 |
| 5,562,348 | 10/1996 | Link | 384/474 |

*Primary Examiner*—Thomas E. Denion
*Attorney, Agent, or Firm*—Hugh D. Jaeger

[57] ABSTRACT

Wheel assemblies including bearings for inline skates and skateboards with provision for lubricating. In one embodiment, a wheel is supported by the bearings which are in turn supported by an axle/spacer having a central chamber and at least one port extending therethrough to the inner surfaces of the bearings. Screws secure the axle/spacer to wheel supports of an inline skate or skateboard. At least one of the screws includes an interior passageway to accommodate a nozzle for introducing lubricant and/or cleaner under pressure to the central chamber from which it passes through the port or ports in the axle/spacer to the inner surfaces of the bearings. In another embodiment, a wheel includes a hub which is supported by the bearings which in turn are supported by an axle/spacer. The hub has at least one port extending therethrough from the outside to the inner surfaces of the bearings for the introduction of lubricant and/or cleaner under pressure. In both assemblies the pressurized lubricant and/or cleaner lubricates and/or cleans the bearings by forcing dirt deposits and other foreign materials outwardly from the inner surfaces of the bearings for subsequent removal, such as by wiping with a towel or cloth.

34 Claims, 3 Drawing Sheets

ND SKATEBOARD BEARINGS

PROCESS AND APPARATUS FOR LUBRICATING INLINE SKATE BEARINGS AND SKATEBOARD BEARINGS

CROSS REFERENCES TO CO-PENDING APPLICATIONS

None.

BACKGROUND OF THE INVENTION

1. Field of the Invention

The present invention relates to novel wheel assemblies with bearings for inline skates or skateboards and, more particularly, pertains to wheel assemblies for inline skates or skateboards having provision for lubricating and/or cleaning the bearings from the inside through holes in either an axle/spacer or a wheel hub without the need for any disassembly. The invention also pertains to the process for lubricating and/or cleaning the bearings.

2. Description of the Prior Art

Lubricating inline skate bearings and skateboard bearings has always been a difficult and inefficient task, as it has been impossible to lubricate and clean the inside of the bearings while on the skate or skateboard because of the protective outer shields of the bearings and the wheel hub and skate frame. Usually, inline skaters in the past have sprayed or dripped lubricant onto the outer shields of the bearings. However, this is inexpedient because it causes dirt and debris to collect and be pushed inwardly toward the inside surfaces of the bearings. The skaters had to disassemble their skates or skateboards to remove material deposits which accumulated while using this type of lubrication procedure and to properly clean and lubricate the bearings.

The present invention overcomes the problems of the prior art cleaning and lubrication measures by cleaning and lubricating the bearings from the inside outwardly, which pushes dirt and other objectionable materials outwardly for subsequent removal, such as by a wiping action with a cloth or towel.

SUMMARY OF THE INVENTION

The general purpose of the present invention is to provide a wheel assembly for inline skates or skateboards which enables lubrication and/or cleaning of the bearings while mounted on an axle/spacer or a wheel hub by passing fluid or dry lubricant under pressure through ports in the axle/spacer or the wheel hub to the inner surfaces of the bearings.

According to one embodiment of the present invention, there is provided an axle/spacer with a chamber extending along the longitudinal axis and a number of ducts or ports extending from the chamber to the outer circumferential surface of the axle/spacer for the passing of lubricants or cleaners. At least one of the screws which mount the axle/spacer includes an interior passageway for receiving lubricants, such as from the nozzle or tubular nozzle extension of a pressurized lubricant container, from a system for dispensing lubricant such as WD40 under pressure, from a grease gun, or from a squirt bottle or similar container of pressurized lubricant, such as Boss Professional QuikLube, Tri-Flow and Tetrodge Speed Clean. The lubricant or cleaner, when applied under pressure, passes through the interior passageway in the screw, through the ducts or ports in the axle/spacer, and subsequently onto the inner surfaces of the opposing bearings with a tendency to push dirt and deposits from the inner surfaces of the bearings to the outer bearing surfaces and thence to the outside surfaces of the wheel or hub for subsequent removal, such as by a wiping action with a cloth or towel.

One significant aspect and feature of the present invention is efficient time and motion lubrication and cleaning of inline skate or skateboard bearings without having to disassemble the bearings from the wheels, as in past lubrication procedures.

Another significant aspect and feature of the present invention is the ability to lubricate and clean inline skate or skateboard bearings when the wheels and bearings are assembled on the inline skate or skateboard.

Another significant aspect and feature of the present invention is the ability to lubricate the inside surfaces of the bearings using pressure while mounted on the inline skate or skateboard, thus causing dirt and other debris to be removed from the inner surfaces of the bearings while simultaneously lubricating the bearings.

Having thus described embodiments and significant aspects and features of the present invention, it is a principal object of the present invention to lubricate and clean inline skate bearings and skateboard bearings from the inside when the bearings are mounted on the axles which hold the wheels to the frames of the inline skates and skateboards.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
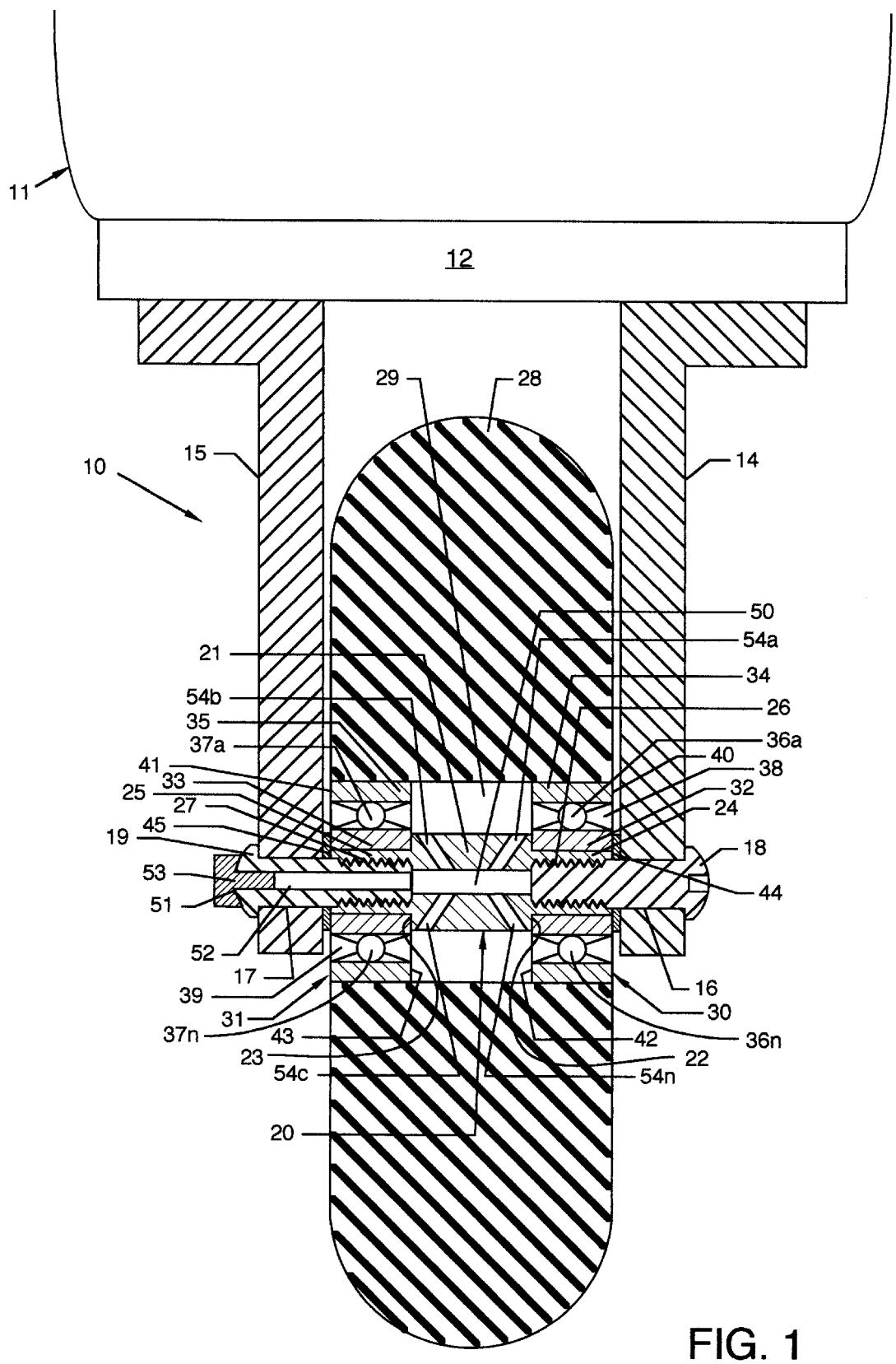
FIG. 1 illustrates a cross sectional view of a wheel assembly including bearings and provision for lubrication according to a first embodiment of the invention shown attached to an inline skate or skateboard depicted schematically.

FIG. 1 illustrates a cross sectional view of a wheel assembly 10, according to a first embodiment of the invention, shown attached to a base 12 of an inline skate or skateboard depicted schematically and designated by the reference numeral 11. Wheel assembly 10 includes wheel supports 14 and 15 suitably affixed to the base 12 and spaced apart to receive therebetween a wheel 28 of rubber or other suitable skate wheel material having a concentric central opening 29. The wheel supports 14 and 15 have holes 16 and 17 for receiving screws 18 and 19 which retain an axle/spacer 20. The axle/spacer 20 has a central body portion 21 having opposite end surfaces 22 and 23 from which extend reduced diameter shafts 24 and 25 which have threaded screw holes 26 and 27 for receiving the screws 18 and 19. A hex nut surface can be provided in the center of the central body portion 21 for gripping with a hex wrench for removal of the screws 18 and 19. Axle/spacer 20 is positioned concentrically within the central opening 29 of the wheel 28 and serves as the axle for wheel 28 and as a spacer for bearings 30 and 31 which are pressed directly onto the reduced diameter shafts 24 and 25 and abut against the opposite end surfaces 22 and 23 of the central body portion 21, thereby being maintained spaced part and positioned adjacent to the sides of the wheel 28. The bearings 30 and 31 are a press fit in the central opening 29 of the wheel 28 and are wholly contained within the central opening 29. Likewise, the length of the axle/spacer 20 from the tip of the shaft 24 to the tip of the shaft 25 is such that the entire axle/spacer 20 resides within the central opening 29.

Wheel 28 is spaced from the wheel supports 14 and 15 by spacers 44 and 45, thus allowing it to rotate freely between the wheel supports 14 and 15. The spacers 44 and 45 can be separate elements or can be integral bosses formed around the holes 16 and 17 on the inside surfaces of the wheel supports 14 and 15.

The bearings 30 and 31 have no seals of any kind but are unsealed or open bearings which are identical in construction and comprise, respectively, inner races 32 and 33, outer races 34 and 35, a plurality of balls or other type of rotational bearing elements 36a–36n and 37a–37n, and outer bearing shields 38 and 39. The bearing shields 38 and 39 serve to hinder dirt and other debris from entering between the inner and outer races and also help to some extent to retain lubricant between the inner and outer races, but they do not entirely close or seal off the areas between the inner and outer races from the exterior. The bearing 30 has an outer surface 40 defined by the collective surfaces of the parts thereof which face the wheel support 14, and an inner surface 42 defined by the collective surfaces of the parts thereof which are exposed within the central opening 29 of the wheel 28. Likewise, bearing 31 has an outer surface 41 defined by the collective surfaces of the parts thereof which face the wheel support 15, and an inner surface 43 defined by the collective surfaces of the parts thereof which are exposed within the central opening 29 of the wheel 28.

As previously mentioned, the bearings 30 and 31 are of the unsealed or open type; that is, they have no seals for confining lubricant between the inner surfaces 42 and 43 and the outer surfaces 40 and 41 thereof or for precluding entry of foreign materials through the outer surfaces 40 and 41 to the areas between the inner and outer races. Not only do the bearings themselves lack seals, but the entire wheel assembly 10 is devoid of seals of any sort. Thus, lubricant can pass from the outside of the inner surfaces 42 and 43 to the outside of the outer surfaces 40 and 41. Although the bearings 30 and 31 include the bearing shields 38 and 39 which serve to hinder dirt and other foreign material from entering into the areas between the inner and outer races and also help to some extent to retain lubricant between the inner and outer races, these bearing shields, as previously mentioned, do not entirely close or seal off the areas between the inner and outer races from the exterior. Consequently, the bearings have a great tendency to collect dirt and other foreign material or debris which inescapably enters into the areas between the inner and outer races where it interferes with proper rolling action of the balls 36a–36n and 37a–37n. Hence, periodic cleaning to remove such dirt and debris is necessary, and it is this which the present invention facilitates.

To this end, the axle/spacer 20 further has a chamber 50 in its central body portion 21 and at least one but preferably a number of ducts or ports 54a–54n communicating with the chamber 50 and extending therefrom through the central body portion 21 to the central opening 29 of the wheel 28 for delivery of lubricant and/or cleaner to the inner surfaces 42 and 43 of the bearings 30 and 31. Although the ducts or ports 54a–54n can be disposed at a right angle with respect to the longitudinal axis of the axle/spacer 20, preferably they are inclined outwardly at some sort of an angle to the longitudinal axis of the axle/spacer 20 such that they are directed toward the inner surfaces 42 and 43 of the bearings 30 and 31, as shown. Such outwardly inclined disposition of the ducts or ports 54a–54n is especially beneficial, as is explained fully below. At least one of the screws 18 and 19, screw 19 in the instance illustrated, is provided with an exterior entrance 51 and an interior passageway 52 extending from the entrance 51 throughout its entire length for the delivery of lubricant and/or cleaner, from such as a pressure nozzle, to the chamber 50 of the central body portion 21 and thence through the ducts or ports 54a–54n in the central body portion 21 to the inner surfaces 42 and 43 of the bearings 30 and 31. A plug 53 is provided for sealing the entrance 51 to the interior passageway 52 and to hold lubricant within the chamber 50 and within the central opening 29 between the bearings 30 and 31.

MODE OF OPERATION

Figure 2:
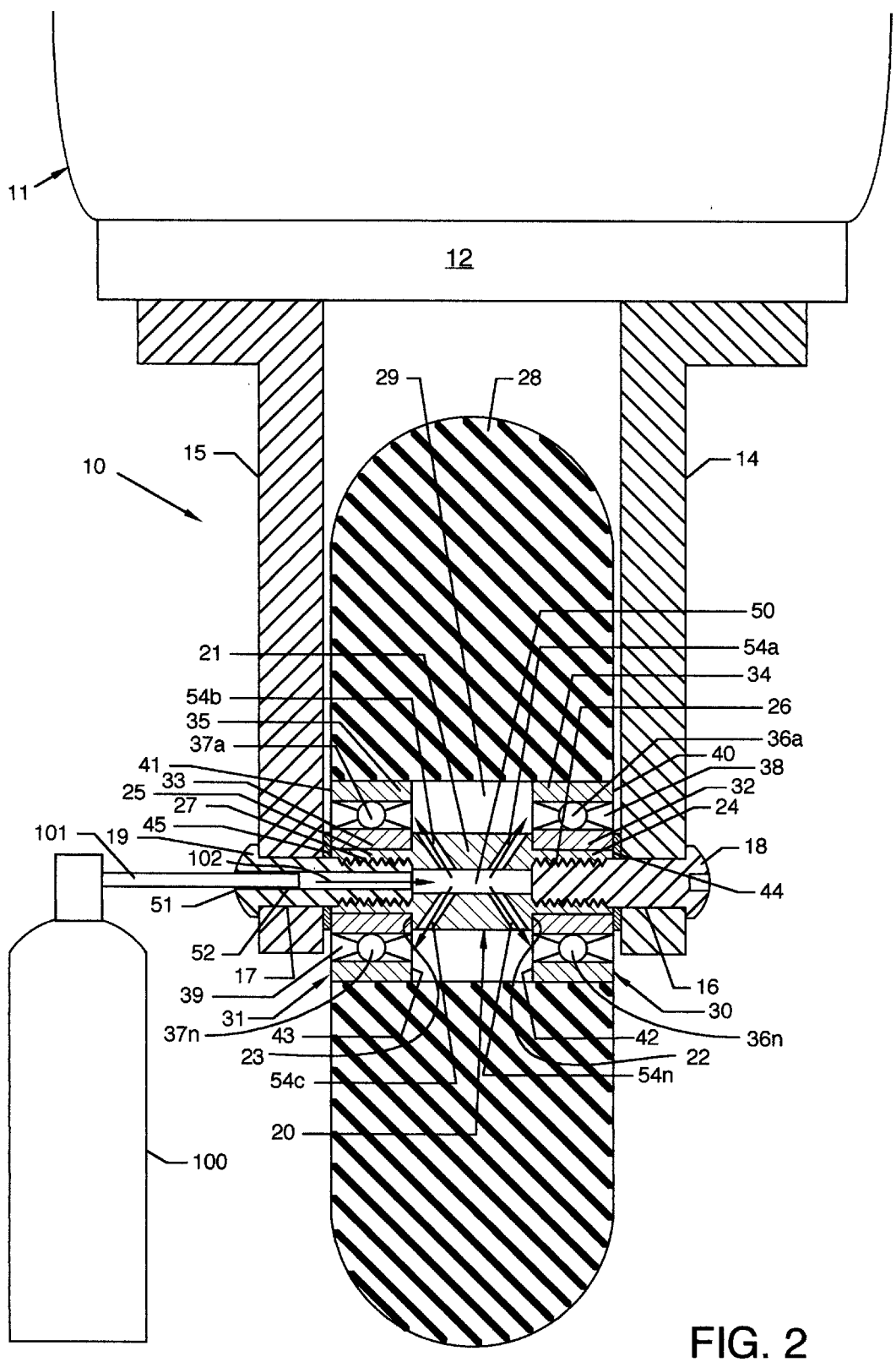
FIG. 2 is a view corresponding to FIG. 1 but showing the wheel assembly associated with a source of lubricant and/or cleaner to illustrate the lubrication and/or cleaning procedure; and, FIG. 3 illustrates a cross sectional view of a wheel assembly including bearings and provision for lubrication according to a second embodiment of the invention shown attached to an inline skate or skateboard depicted schematically.

With reference to FIG. 2, the Mode of Operation and process for lubricating and/or cleaning the bearings 30 and 31 is now described. FIG. 2 illustrates the construction of FIG. 1 associated with a source 100 of fluid lubricant and/or cleaner which includes a pressure nozzle 101 shown engaged in the interior passageway 52 of the screw 19 for introduction of fluid lubricant and/or cleaner 102 from the source 100 through the interior passageway 52 to the chamber 50 and then through the ducts or ports 54a–54n in the central body portion 21 toward the inner surfaces 42 and 43 of the opposing bearings 30 and 31. As mentioned earlier, the ducts or ports 54a–54n preferably are inclined toward the inner surfaces 42 and 43 of the bearings, thus directing lubricant and/or cleaner to those surfaces with greater force than would be attainable if the ducts or ports 54a–54n were disposed at right angles to the longitudinal axis of the axle/spacer 20 instead. The lubricant and/or cleaner 102 under pressure not only lubricates and/or cleans the inner races 32 and 33, the outer races 34 and 35, the balls or other rotational bearing elements 36a–36n and 37a–37n, and the bearing shields 38 and 39 of the bearings 30 and 31, but also forces or flushes any dirt and other detrimental material or debris within the bearings 30 and 31 toward the outer surfaces 40 and 41 of the bearings 30 and 31 where it subsequently can be removed, such as by wiping with a cloth or towel. Thus, the invention provides for both lubrication and cleansing of the bearings without any disassembly. Upon completion of lubrication and/or cleansing, the nozzle 101 is removed and the plug 53, which had been removed initially, is re-installed.

Figure 3:
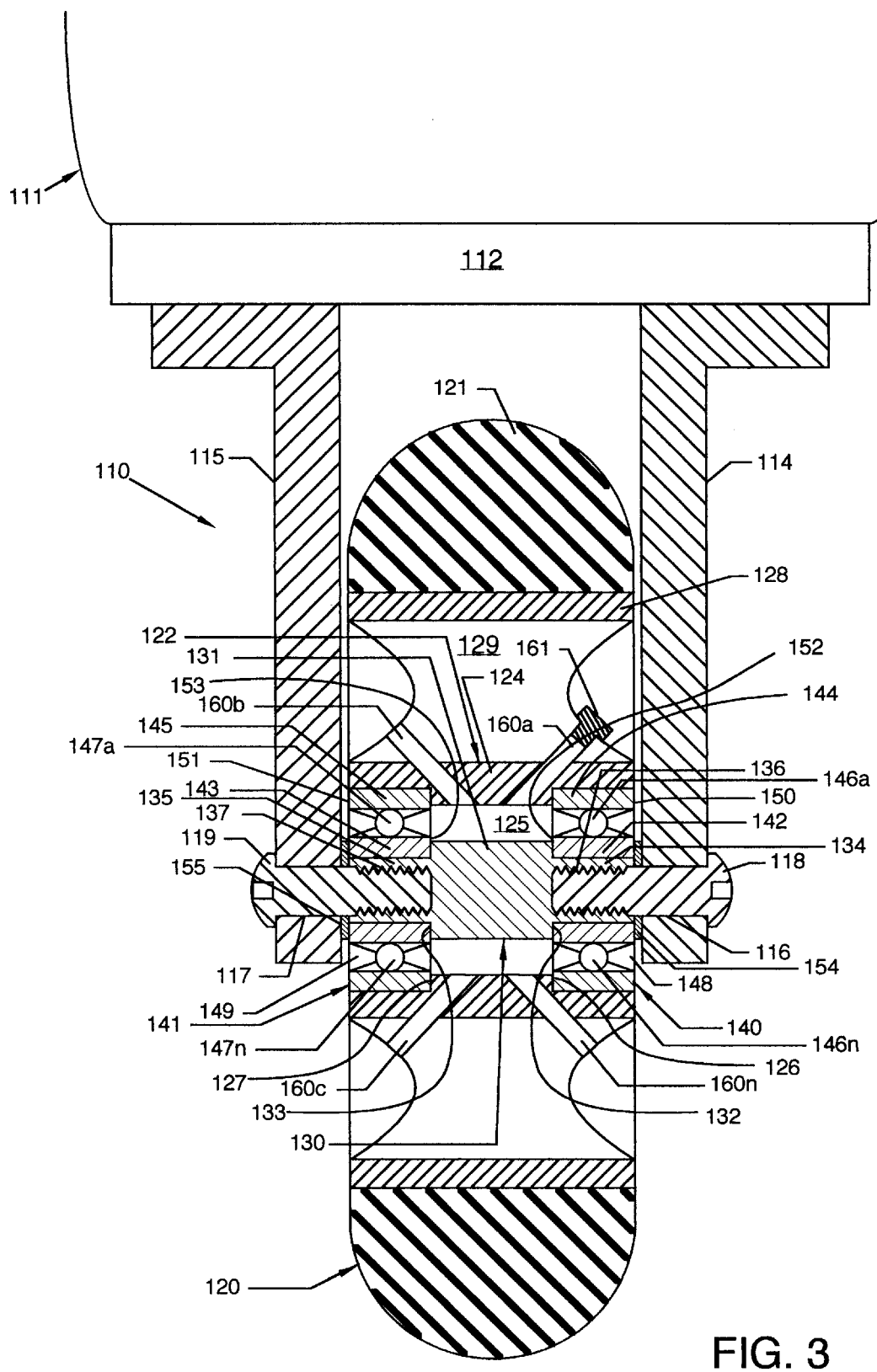

FIG. 3 illustrates a cross sectional view of a wheel assembly 110, according to a second or alternative embodiment of the invention, shown attached to a base 112 of an inline skate or skateboard depicted schematically and designated by the reference numeral 111. Wheel assembly 110 includes wheel supports 114 and 115 suitably affixed to the base 112 and spaced apart to receive therebetween a wheel 120 composed of a rubber, or other suitable material, wheel portion 121 supported on a hub 122. The hub 122 comprises an inner cylindrical member 124 having a concentric open center 125, and an outer cylindrical member 128 spaced from the inner cylindrical member 124 and connected thereto by a plurality of spokes or struts 129. The rubber wheel portion 121 is attached to the outer cylindrical member 128. The wheel supports 114 and 115 have holes 116 and 117 for receiving screws 118 and 119 which retain an axle/spacer 130. The axle/spacer 130 has a central body portion 131 having opposite end surfaces 132 and 133 from which extend reduced diameter shafts 134 and 135 which have threaded screw holes 136 and 137 for receiving the screws 118 and 119. A hex nut surface can be provided in the center of the central body portion 131 for gripping with a hex wrench for removal of the screws 118 and 119. Axle/spacer 130 is positioned concentrically within the open center 125 of the inner cylindrical member 124 of the hub 122 and serves as the axle for wheel 120 and as a spacer for bearings 140 and 141 which are pressed directly onto the reduced diameter shafts 134 and 135 and abut against the opposite end surfaces 132 and 133 of the central body portion 131, thereby being maintained spaced apart and positioned adjacent to the sides of the wheel 120. The bearings 140 and 141 are a press fit in the open center 125 of the inner cylindrical member 124 and abut against internal shoulders 126 and 127 formed in the inner cylindrical member 124. The bearings 140 and 141 are wholly contained within the open center 125. Likewise, the length of the axle/spacer 130 from the tip of the shaft 134 to the tip of the shaft 135 is such that the entire axle/spacer 130 resides within the open center 125.

Wheel 120 is spaced from the wheel supports 114 and 115 by spacers 154 and 155, thus allowing it to rotate freely between the wheel supports 114 and 115. The spacers 154 and 155 can be separate elements or can be integral bosses formed around the holes 116 and 117 on the inside surfaces of the wheel supports 114 and 115.

The bearings 140 and 141 have no seals of any kind but are unsealed or open bearings which are identical in construction and comprise, respectively, inner races 142 and 143, outer races 144 and 145, a plurality of balls or other type of rotational bearing elements 146a–146n and 147a–147n, and outer bearing shields 148 and 149. The bearing shields 148 and 149 serve to hinder dirt and other debris from entering between the inner and outer races and also helps to some extent to retain lubricant between the inner and outer races, but they do not entirely close or seal off the areas between the inner and outer races from the exterior. The bearing 140 has an outer surface 150 defined by the collective surfaces of the parts thereof which face the wheel support 114, and an inner surface 152 defined by the collective surfaces of the parts thereof which are exposed within the open center 125 of the inner cylindrical member 124 of the hub 122. Likewise, bearing 141 has an outer surface 151 defined by the collective surfaces of the parts thereof which face the wheel support 115, and an inner surface 153 defined by the collective surfaces of the parts thereof which are exposed within the open center 125 of the inner cylindrical member 124 of the hub 122.

As previously mentioned, the bearings 140 and 141 are of the unsealed or open type; that is, they have no seals for confining lubricant between the inner surfaces 152 and 153 and the outer surfaces 150 and 151 thereof or for precluding entry of foreign materials through the outer surfaces 150 and 151 to the areas between the inner and outer races. Not only do the bearings themselves lack seals, but the entire wheel assembly 110 is devoid of seals of any sort. Thus, lubricant can pass from the outside of the inner surfaces 152 and 153 to the outside of the outer surfaces 150 and 151. Although the bearings 140 and 141 include the bearing shields 148 and 149 which serve to hinder dirt and other foreign material from entering into the areas between the inner and outer races and also help to some extent to retain lubricant between the inner and outer races, these bearing shields, as previously mentioned, do not entirely close or seal off the areas between the inner and outer races from the exterior. Consequently, the bearings have a great tendency to collect dirt and other foreign material or debris which inescapably enters into the areas between the inner and outer races where it interferes with proper rolling action of the balls 146a–146n and 147a–147n. Hence, periodic cleaning to remove such dirt and debris is necessary, and it is this which is facilitated by the construction next set forth.

Specifically, the hub 122 further has at least one but preferably a number of ducts or ports 160a–160n leading from entrances thereto at the exterior of the hub through the spokes or struts 129 and through the inner cylindrical member 124 to the open center 125 for delivery of lubricant and/or cleaner, from such as a pressure nozzle, to the inner surfaces 152 and 153 of the bearings 140 and 141. The lubricant and/or cleaner, especially when introduced under pressure, not only lubricates and/or cleans the inner races 142 and 143, the outer races 144 and 145, the balls or other rotational bearing elements 146a–146n and 147a–147n, and the bearing shields 148 and 149 of the bearings 140 and 141, but also forces or flushes any dirt and other undesirable material within the bearings 140 and 141 outwardly to the outer surfaces 150 and 151 where it subsequently can be removed, such as by wiping with a cloth or towel. Plugs, only one of which is shown at 161, normally are provided for sealing the entrances of the ducts or ports 160a–160n and to hold lubricant within the open center 125 of the inner cylindrical member 124 of the hub 122. Thus, the second embodiment of the invention, like the first, provides for both lubrication and cleansing of the bearings without the need for any disassembly.

Both embodiments of the invention have the advantage of being able to be applied easily to existing inline skates or skateboards simply by removing the wheels and axles of the existing inline skates or skateboards and substituting the wheels and associated parts of the invention.

Various modifications can be made to the present invention without departing from the apparent scope hereof.

We claim:

1. A wheel assembly with provision for at least one of the group consisting of lubricating and cleaning for use with an inline skate or a skateboard, comprising:

a. a pair of spaced apart wheel supports;
   b. a wheel positioned between said spaced apart wheel supports, said wheel having a concentric central opening;
   c. an axle/spacer positioned within said central opening of said wheel, said axle/spacer extending from one side of said wheel to the other side of said wheel and held in a concentric position with respect to said wheel by two bearings, said two bearings being separated from one another with one bearing positioned at one side of said wheel and the other bearing positioned at the other side of said wheel, thereby providing a space between said two bearings for receiving said at least one of said group consisting of lubricating and cleaning;
   d. said axle/spacer being attached to said pair of spaced apart wheel supports by two screws, at least one of said two screws having an exterior entrance and an interior passageway extending from said entrance throughout its entire length for delivery of said at least one of said group consisting of lubricating and cleaning when provided to said entrance;

e. said axle/spacer having a central body portion with a chamber therein which adjoins said interior passageway, and said axle/spacer further having at least one port extending through said central body portion from said chamber to said space between said two bearings for delivery of at least one of said groups consisting of lubricating and cleaning to said two bearings; whereby, f. at least one of said group consisting of lubricating and cleaning, when provided to said entrance, can pass through said interior passageway into said chamber, then through said at least one port in said central body portion to said space between said two bearings, and then outwardly through said two bearings to the sides of said wheel.

2. The wheel assembly of claim 1, further comprising a plug positioned within said exterior entrance to prevent dirt and debris from entering said exterior entrance and to hold lubricant within said chamber and said space between said two bearings.

3. The wheel assembly of claim 1, wherein each of said two bearings comprises an inner race, an outer race, and a plurality of rotational bearing elements located between said inner and outer races, and wherein each of said two bearings is an unsealed bearing whereby at least one of said group consisting of lubricating and cleaning can pass through said two bearings between said inner and outer races from said space between said two bearings to the sides of said wheel.

4. The wheel assembly of claim 3, further comprising an outer bearing shield on each bearing to hinder dirt and debris from entering into the area between said inner and outer races and to help retain lubricant between said inner and outer races.

5. The wheel assembly of claim 4, further comprising a plug positioned within said exterior entrance to prevent dirt and debris from entering said exterior entrance and to hold lubricant within said chamber and said space between said two bearings.

6. The wheel assembly of claim 1, wherein a plurality of ports extend through said central body portion from said chamber to said space between said two bearings.

7. The wheel assembly of claim 6, wherein some ports of said plurality of ports extend through said central body portion in a direction toward said bearing positioned at said one side of said wheel, and all of the other ports of said plurality of ports extend through said central body portion in a direction toward said bearing positioned at said other side of said wheel.

8. A wheel assembly with provision for at least one of the group consisting of lubricating and cleaning for use with an inline skate or a skateboard, comprising:

a. a pair of spaced apart wheel supports;

b. a wheel positioned between said spaced apart wheel supports, said wheel having a concentric central opening;

c. an axle/spacer positioned between said spaced apart wheel supports and within said central opening, the entire axle/spacer residing within said central opening, said axle/spacer having opposite ends attached to said spaced apart wheel supports by two screws, one screw at each of said opposite ends;

d. two bearings, each with an inner race and an outer race, said inner race of each bearing being in direct contact with said axle/spacer, said outer race of each bearing being in direct contact with said wheel within said central opening of said wheel, and said two bearings being positioned with a space between them;

e. one of said two screws having an interior passageway extending throughout its length that provides passage for at least one of said group consisting of lubricating a cleaning from an exterior entrance thereof to said axle/spacer;

f. said axle/spacer having a chamber therewithin in communication with said interior passageway and at least one port extending from said chamber to said space between said two bearings at an angle inclined with respect to the longitudinal axis of said axle/spacer; and, g. said space between said two bearings being directly adjacent to said two bearings and in communication with the areas between said inner and outer races of said two bearings.

9. The wheel assembly of claim 8, wherein said two bearings are both unsealed bearings.

10. The wheel assembly of claim 8, wherein a plurality of ports extend from said chamber to said space between said two bearings, each said port extending at an angle inclined with respect to the longitudinal axis of said axle/spacer, some of said ports being directed toward one of said two bearings, and the rest of said ports being directed toward the other of said two bearings.

11. The wheel assembly of claim 8, wherein the entire wheel assembly is completely devoid of seals of any kind.

12. A wheel assembly with provision for at least one of the group consisting of lubricating and cleaning for use with an inline skate or a skateboard, comprising:

a. a pair of spaced apart wheel supports;

b. a wheel hub including an inner cylindrical member having an open center, an outer cylindrical member concentric with said inner cylindrical member, and a plurality of spokes connecting said outer cylindrical member to said inner cylindrical member;

c. a wheel portion concentrically positioned around said outer cylindrical member;

d. an axle/spacer positioned between said spaced apart wheel supports and within said open center of said inner cylindrical member, the entire axle/spacer residing within said open center, said axle/spacer having opposite ends attached to said spaced apart wheel supports by two screws, one screw at each of said opposite ends;

e. two bearings, each with an inner race and an outer race, said inner race of each bearing being in direct contact with said axle/spacer, said outer race of each bearing being in direct contact with said inner cylindrical member within said open center thereof, and said two bearings being positioned with a space between them;

f. at least one port extending from an entrance external of said spokes through said inner cylindrical member to said open center for passage of at least one of said group consisting of lubricating and cleaning to said space between said two bearings; and, g. said space between said two bearings being directly adjacent to said two bearings and in communication with the areas between said inner and outer races of said two bearings.

13. The wheel assembly of claim 12, wherein a plurality of ports each with an entrance external of said spokes extend through said inner cylindrical member to said open center for passage of at least one of said group consisting of lubricating and cleaning to said space between said two bearings.

14. The wheel assembly of claim 12, wherein each of said two bearings is an unsealed bearing, whereby at least one of said group consisting of lubricating and cleaning can pass through said two bearings between said inner and outer races from said space between said two bearings to the sides of said wheel hub.

15. The wheel assembly of claim 12, wherein said entrance external of said spokes is closed with a plug to prevent dirt and debris from entering into said at least one port.

16. A wheel assembly with provision for at least one of the group consisting of lubricating and cleaning for use with an inline skate or a skateboard, comprising:
   a. a wheel, said wheel having a concentric central opening;
   b. an axle/spacer positioned within said central opening of said wheel, said axle/spacer extending from one side of said wheel to the other side of said wheel and held in a concentric position with respect to said wheel by two bearings, said two bearings being separated from one another with one bearing positioned at one side of said wheel and the other bearing positioned at the other side of said wheel, thereby providing a space between said two bearings for receiving at least one of said group consisting of lubricating and cleaning, said axle/spacer having opposite ends positioned adjacent to the sides of said wheel, said opposite ends each having a threaded screw hole extending along the longitudinal axis of said axle/spacer;
   c. a pair of screws for receipt within said threaded screw holes of said axle/spacer for affixing said axle/spacer to wheel supports of an inline skate or a skateboard, at least one of said screws having an interior passageway extending throughout its length and an exterior entrance to said interior passageway; and,
   d. said axle/spacer further having a central body portion with a chamber therein, and at least one port extending through said central body portion from said chamber to said space between said two bearings.

17. A wheel assembly with provision for at least one of the group consisting of lubricating and cleaning for use with an inline skate or a skateboard, comprising:
   a. a wheel hub including an inner cylindrical member having an open center, an outer cylindrical member concentric with said inner cylindrical member, and a plurality of spokes connecting said outer cylindrical member to said inner cylindrical member;
   b. a wheel portion concentrically positioned around said outer cylindrical member;
   c. an axle/spacer positioned within said open center of said inner cylindrical member, the entire axle/spacer residing within said open center, said axle/spacer having opposite ends, said opposite ends each having a threaded screw hole extending along the longitudinal axis of said axle/spacer;
   d. a pair of screws for receipt within said threaded screw holes of said axle/spacer for affixing said axle/spacer to wheel supports of an inline skate or a skateboard;
   e. two bearings, said two bearings being positioned within said open center of said inner cylindrical member with a space between them, one of said two bearings being located at one of said opposite ends of said axle/spacer and the other of said two bearings being located at the other of said opposite ends of said axle/spacer, said two bearings each being in direct contact with said axle/spacer and in direct contact with said inner cylindrical member and holding said axle/spacer in a concentric position within said open center;
   f. at least one port extending from an entrance external of said spokes through said inner cylindrical member to said open center for passage of at least one of said group consisting of lubricating and cleaning to said space between said two bearings; and,
   g. said space between said two bearings being directly adjacent to said two bearings.

18. A process for a wheel assembly with provision for at least one of the group consisting of lubricating and cleaning for use with an inline skate or a skateboard, comprising:
   a. spacing apart a pair of wheel supports;
   b. positioning a wheel between said spaced apart wheel supports, said wheel having a concentric central opening;
   c. positioning an axle/spacer within said central opening of said wheel, said axle/spacer extending from one side of said wheel to the other side of said wheel and held in a concentric position with respect to said wheel by two bearings, said two bearings being separated from one another with one bearing positioned at one side of said wheel and the other bearing positioned at the other side of said wheel, thereby providing a space between said two bearings for receiving at least one of said group consisting of lubricating and cleaning;
   d. attaching said axle/spacer to said pair of spaced apart wheel supports by two screws, at least one of said screws having an exterior entrance and an interior passageway extending from said entrance throughout its entire length for delivery of at least one of said group consisting of lubricating and cleaning when provided to said entrance;
   e. providing said axle/spacer with a central body portion with a chamber therein which adjoins said interior passageway, and said axle/spacer further having at least one port extending through said central body portion from said chamber to said space between said two bearings for delivery of at least one of said group consisting of lubricating and cleaning to said two bearings; whereby at least one of said group consisting of lubricating and cleaning, when provided to said entrance, can pass through said interior passageway into said chamber, then through said at least one port in said central body portion to said space between said two bearings, and then outwardly through said two bearings to the sides of said wheel.

19. The process of claim 18, further comprising a plug positioned within said exterior entrance to prevent dirt and debris from entering said exterior entrance and to hold lubricant within said chamber and said space between said two bearings.

20. The process of claim 18, wherein each of said two bearings comprises an inner race, an outer race, and a plurality of rotational bearing elements located between said inner and outer races, and wherein each of said two bearings is an unsealed bearing whereby at least one of said group consisting of lubricating and cleaning can pass through said two bearings between said inner and outer races from said space between said two bearings to the sides of said wheel.

21. The process of claim 20, further comprising an outer bearing shield on each bearing to hinder dirt and debris from entering into the area between said inner and outer races and to help retain lubricant between said inner and outer races.

22. The process of claim 21, further comprising a plug positioned within said exterior entrance to prevent dirt and debris from entering said exterior entrance and to hold lubricant within said chamber and said space between said two bearings.

23. The process of claim 18, wherein a plurality of ports extend through said central body portion from said chamber to said space between said two bearings.

24. The process of claim 23, wherein some ports of said plurality of ports extend through said central body portion in a direction toward said bearing positioned at said one side of said wheel, and all of the other ports of said plurality of ports extend through said central body portion in a direction toward said bearing positioned at said other side of said wheel.

25. A process for a wheel assembly with provision for at least one of the group consisting of lubricating and cleaning for use with an inline skate or a skateboard, comprising:
   a. spacing apart a pair of wheel supports;
   b. positioning a wheel between said spaced apart wheel supports, said wheel having a concentric central opening;
   c. positioning an axle/spacer between said spaced apart wheel supports and within said central opening, the entire axle/spacer residing within said central opening, said axle/spacer having opposite ends attached to said spaced apart wheel supports by two screws, one screw at each of said opposite ends;
   d. positioning two bearings, each with an inner race and an outer race, said inner race of each bearing being in direct contact with said axle/spacer, said outer race of each bearing being in direct contact with said wheel within said central opening of said wheel, and said two bearings being positioned with a space between them;
   e. providing one of said screws having an interior passageway extending throughout its length with a passage for at least one of said group consisting of lubricating and cleaning from an exterior entrance thereof to said axle/spacer;
   f. providing said axle/spacer having a chamber therewithin in communication with said interior passageway and at least one port extending from said chamber to said space between said two bearings at an angle inclined with respect to the longitudinal axis of said axle/spacer; and,
   g. providing said space between said two bearings being directly adjacent to said two bearings and in communication with the areas between said inner and outer races of said two bearings.

26. The process of claim 25, wherein said two bearings are both unsealed bearings.

27. The process of claim 25, wherein a plurality of ports extend from said chamber to said space between said two bearings, each said port extending at an angle inclined with respect to the longitudinal axis of said axle/spacer, some of said ports being directed toward one of said two bearings, and the rest of said ports being directed toward the other of said two bearings.

28. The process of claim 25, wherein the entire wheel assembly is completely devoid of seals of any kind.

29. A process for a wheel assembly with provision for at least one of the group consisting of lubricating and cleaning for use with an inline skate or a skateboard, comprising:
   a. spacing apart a pair of wheel supports;
   b. providing a wheel hub including an inner cylindrical member having an open center, an outer cylindrical member concentric with said inner cylindrical member, and a plurality of spokes connecting said outer cylindrical member to said inner cylindrical member;
   c. providing a wheel portion concentrically positioned around said outer cylindrical member;
   d. positioning an axle/spacer between said spaced apart wheel supports and within said open center of said inner cylindrical member, the entire axle/spacer residing within said open center, said axle/spacer having opposite ends attached to said spaced apart wheel supports by two screws, one screw at each of said opposite ends;
   e. providing two bearings, each with an inner race and an outer race, said inner race of each bearing being in direct contact with said axle/spacer, said outer race of each bearing being in direct contact with said inner cylindrical member within said open center thereof, and said two bearings being positioned with a space between them;
   f. providing at least one port extending from an entrance external of said spokes through said inner cylindrical member to said open center for passage of at least one of said group consisting of lubricating and cleaning to said space between said two bearings; and,
   g. providing said space between said two bearings being directly adjacent to said two bearings and in communication with the areas between said inner and outer races of said two bearings.

30. The process of claim 29, wherein a plurality of ports each with an entrance external of said spokes extend through said inner cylindrical member to said open center for passage of at least one of said group consisting of lubricating and cleaning to said space between said two bearings.

31. The process of claim 29, wherein each of said two bearings is an unsealed bearing, whereby at least one of said group consisting of lubricating and cleaning can pass through said two bearings between said inner and outer races from said space between said two bearings to the sides of said wheel hub.

32. The process of claim 29, wherein said entrance external of said spokes is closed with a plug to prevent dirt and debris from entering into said at least one port.

33. A process for a wheel assembly with provision for at least one of the group consisting of lubricating and cleaning for use with an inline skate or a skateboard, comprising:
   a. providing a wheel with a concentric central opening;
   b. positioning an axle/spacer within said central opening of said wheel, said axle/spacer extending from one side of said wheel to the other side of said wheel and held in a concentric position with respect to said wheel by two bearings, said two bearings being separated from one another with one bearing positioned at one side of said wheel and the other bearing positioned at the other side of said wheel, thereby providing a space between said two bearings for receiving at least one of said group consisting of lubricating and cleaning, said axle/spacer having opposite ends positioned adjacent to the sides of said wheel, said opposite ends each having a threaded screw hole extending along the longitudinal axis of said axle/spacer; and,
   c. receipting a pair of screws within said threaded screw holes of said axle/spacer for affixing said axle/spacer to wheel supports of an inline skate or a skateboard, at least one of said screws having an interior passageway extending throughout its length and an exterior entrance to said interior passageway, said axle/spacer further having a central body portion with a chamber therein, and at least one port extending through said central body portion from said chamber to said space between said two bearings.

34. A process for a wheel assembly with provision for at least one of the group consisting of lubricating and cleaning for use with an inline skate or a skateboard, comprising:

a. providing a wheel hub including an inner cylindrical member having an open center, an outer cylindrical member concentric with said inner cylindrical member, and a plurality of spokes connecting said outer cylindrical member to said inner cylindrical member;

b. positioning a wheel portion concentrically around said outer cylindrical member;

c. positioning an axle/spacer within said open center of said inner cylindrical member, the entire axle/spacer residing within said open center, said axle/spacer having opposite ends, said opposite ends each having a threaded screw hole extending along the longitudinal axis of said axle/spacer;

d. receipting a pair of screws within said threaded screw holes of said axle/spacer for affixing said axle/spacer to wheel supports of an inline skate or a skateboard;

e. positioning two bearings within said open center of said inner cylindrical member with a space between them, one of said two bearings being located at one of said opposite ends of said axle/spacer and the other of said two bearings being located at the other of said opposite ends of said axle/spacer, said two bearings each being in direct contact with said axle/spacer and in direct contact with said inner cylindrical member and holding said axle/spacer in a concentric position within said open center; and, f. extending at least one port from an entrance external of said spokes through said inner cylindrical member to said open center for passage of at least one of said group consisting of lubricating and cleaning to said space between said two bearings, with said space between said two bearings being directly adjacent to said two bearings.

* * * * *